United States Patent [19]

Yoshisato

[11] Patent Number: 4,544,951
[45] Date of Patent: Oct. 1, 1985

[54] VIDEO CLAMPING CIRCUIT

[75] Inventor: Akiyuki Yoshisato, Soma, Japan

[73] Assignee: Alps Electric Co., Ltd., Japan

[21] Appl. No.: 484,193

[22] Filed: Apr. 12, 1983

[30] Foreign Application Priority Data

Apr. 12, 1982 [JP] Japan .................. 57-60759

[51] Int. Cl.$^4$ ............ H04N 5/18; H04N 5/16
[52] U.S. Cl. .................... 358/172; 358/173;
307/540; 307/542; 307/559
[58] Field of Search .............. 358/34, 171, 172, 173;
307/3, 540, 541, 542, 544, 546, 557, 559, 561, 565

[56] References Cited

U.S. PATENT DOCUMENTS 3,392,236  8/1968  Foster ........................ 358/171
3,542,944  11/1970 Peffer ........................ 358/173
4,261,015  4/1981  Dakroub ...................... 358/172
4,296,437  10/1981 Feurts ........................ 358/173

Primary Examiner—Tommy P. Chin
Attorney, Agent, or Firm—Guy W. Shoup

[57] ABSTRACT

A video clamping circuit adapted for satellite communication includes an operational amplifier for detecting the current flowing into a diode connected to the input terminal of the buffer amplifier of the circuit. The circuit further includes rectifying and smoothing elements for deriving a DC voltage from the output from the operational amplifier and adding the DC voltage to the signal of the output stage of the buffer amplifier in an anti-phase relation, so that an energy dispersal signal superimposed on a video signal is removed and waveform distortion is minimized.

2 Claims, 18 Drawing Figures (A)

(B)

(C)

(D)

VIDEO CLAMPING CIRCUIT

FIELD OF THE INVENTION

The present invention relates to a video clamping circuit and, more particularly, to a video clamping circuit which can be used for satellite communication systems where an energy dispersal signal in the form of triangular waveform of 30 Hz, for example, is superimposed on a video signal for reception. The circuit operates by smoothing and clamping a current flowing into a clamping diode, in an anti-phase relation, thereby removing the energy dispersal signal and at the same time eliminating distortion from the output waveform of the video signal.

BACKGROUND OF THE INVENTION

Heretofore, video clamping circuits used in satellite communication systems have employed a configuration as shown in FIG. 1. By referring to FIGS. 1-3, the problems that the prior art circuit have encountered are discussed below.

Referring first to FIG. 1, the circuit includes a clamping capacitor 1, a clamping diode 2, a transistor 3, an emitter resistor 4, a capacitor 5 for cutting off DC components, bias resistors 6 and 7, and bypass capacitors 8 and 9. It will be understood later that a device similar to the transistor 3 constitutes the buffer amplifier of a circuit according to the present invention.

An input signal (FIG. 5(A)) consisting of a video signal on which an energy dispersal signal in the form of a triangular waveform of 30 Hz, for example, is superimposed is applied to input terminal IN. This input signal is shown in FIG. 2(A) more accurately. A small value is selected for the capacitance of the capacitor 1 so that whenever a horizontal sync signal is produced the diode 2 is triggered into conduction. In particular, electric charges stored in the capacitor 1 in a polarity relation as shown are discharged by a parallel resistance which is the combination of the input resistance of the emitter follower circuit formed by the transistor 3 and the resistance produced when the clamping diode is reverse-biased. The time constant of the discharge is so determined that the discharge occurs substantially with the period of the horizontal sync signal by appropriately selecting the capacitance of the capacitor 1.

In this way, by selecting a small value for the capacitance of the capacitance 1, it is possible to clamp the potential of each leading edge of the horizontal sync signal shown in FIG. 2(A) at a constant value in synchronism with the ocurrence of the sync signal. Therefore, any low frequency component like an energy dispersal signal synchronized with a vertical sync signal can be eliminated. The aforementioned clamping at a constant potential means that the potential at point A is maintained at a given potential while the diode 2 is in a conduction state. That is, in this state of the diode 2, the voltage $V_B$ of a B-power supply is divided down to a voltage $K \cdot V_B$ by the resistors 6 and 7, and a voltage $V_f$ applied to the diode 2 in the forward direction is subtracted from the voltage $k \cdot V_B$ with the result that a constant voltage is applied to the point A.

The capacitor 1 should function to pass a video signal, and an ideally passed waveform is shown in FIG. 3(A). However, a small capacitance of the capacitor 1 introduces a distortion in the output waveform of the video signal as shown in FIG. 3(B). This phenomenon will be readily understood from the fact that an excessively small capacitance of the capacitor 1 deteriorates its low frequency characteristics. Consequently, it is required that a relatively large value be selected for the capacitance of the capacitor 1, but as the capacitance is increased, the aforesaid energy dispersal signal is less effectively removed. This is discussed in more detail in the following.

The deterioration in the percentage of the removal depends considerably on the fact that the diode 2 exhibits a forward direction characteristic as shown in FIG. 2(D). Specifically, if the capacitance of the capacitor 1 is relatively large, then the capacitor 1 will not be discharged completely at the instant that the horizontal sync signal is introduced, thus rendering current If flowing through the diode 2 in the forward direction relatively small. Therefore, there exists a difference $\Delta If$ between the current value of the triangular waveform when it rises and the value when it falls as shown in FIG. 2(B). This causes the voltage Vf applied to the diode 2 to change by a relatively large value $\Delta Vf(B)$ as shown in FIG. 2(D). As a result, the potential at point A of FIG. 1 varies comparatively greatly between the instant at which the waveform is on the increase and the instant at which it is on the decrease.

Conversely, if the capacitance of the capacitor 1 is relatively small, the capacitor is completely discharged until the horizontal sync signal is introduced and so the current If flowing through the diode 2 in the forward direction is relatively large. By this reason, even if there exists the aforementioned current value difference $\Delta If$ in the triangular waveform between the two points as shown in FIG. 2(C), the voltage Vf varies by a smaller value $\Delta Vf(C)$ as shown in FIG. 2(D). As such, the variation in the potential at the point A of FIG. 1 is smaller.

Accordingly, the percentage of removal of the energy dispersal signal must be determined by making a trade-off with the waveform distortion. For the waveform distortion as shown in FIG. 3(B), vertical sync distortion and so forth should be held within a negligible level, say 5%. A satisfactory result will not result, because experiment shows that the ratio of the removed dispersal signal is simply on the order of 26 dB. The minimum detectable value of the ratio is 35 to 40 dB, and general specifications require 40 dB.

SUMMARY OF THE INVENTION

Accordingly, it is an object of the present invention to provide a video clamping circuit which is capable of sufficiently removing energy dispersal signal components while using a capacitor having a relatively large capacitance for sufficiently suppressing waveform distortions and the like.

This object is accomplished by providing a video clamping circuit which includes a buffer amplifier, a diode connected to the input terminal of the amplifier, an operational amplifier for detecting the current flowing into the diode and amplifying it, and means for rectifying and smoothing the output from the operational amplifier and then superimposing the resultant signal on the signal of the output stage of the buffer amplifier in an anti-phase relation.

DETAILED DESCRIPTION OF THE INVENTION

Figure 4:
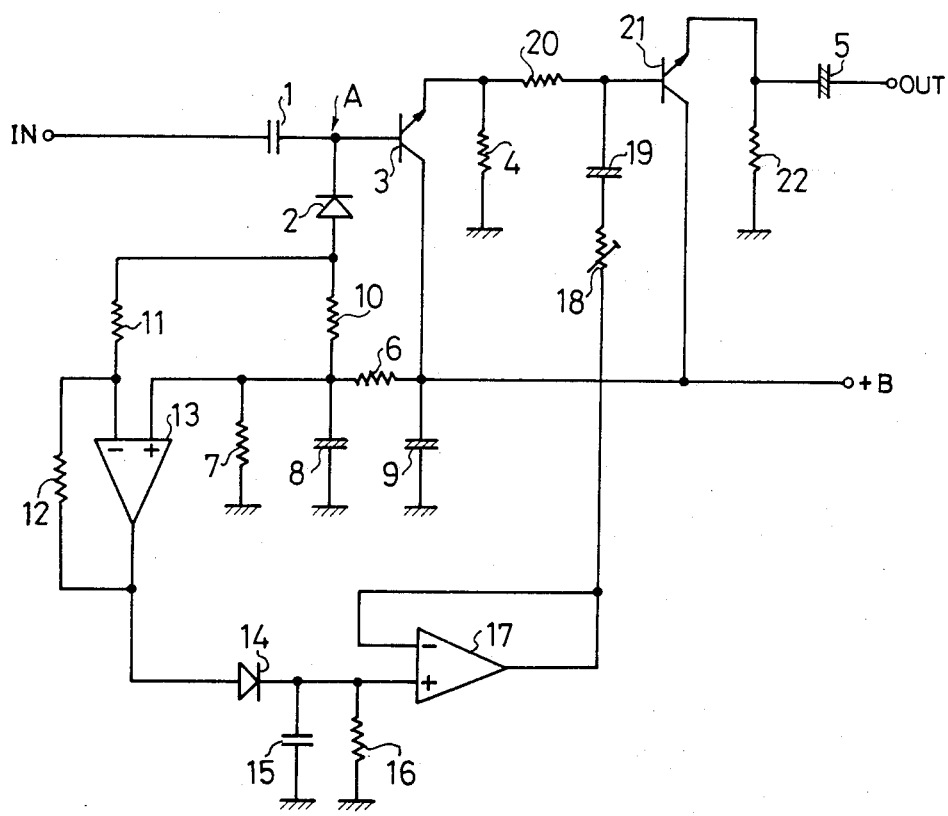
FIG. 4 is a circuit diagram of one example of the present invention.

Referring next to FIG. 4, there is shown the configuration of one example of the present invention. The circuit has parts 1–9 which correspond to those of FIG. 1 denoted by the same reference numerals. The circuit further includes a resistor 10 for detecting the current If, an input resistor 11, a feedback resistor 12, an operational amplifier 13, a diode 14, a smoothing capacitor 15, another resistor 16, another operational amplifier 17, a resistor 18 for adjusting the coupling, a capacitor 19 for cutting off DC components, a coupling resistor 20, a transistor 21 and an emitter resistor 22.

Figure 1:
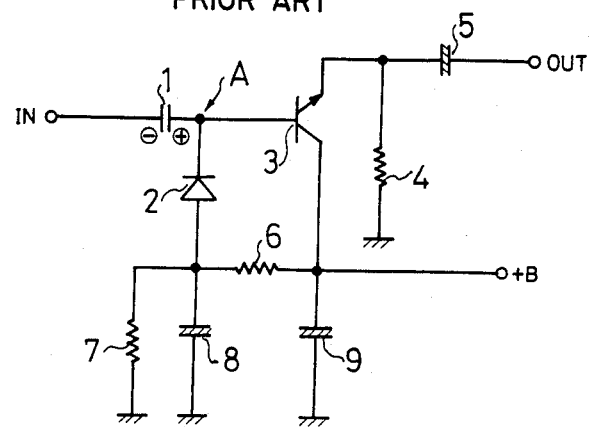
FIG. 1 is a circuit diagram of a conventional clamping circuit.
Figure 2:
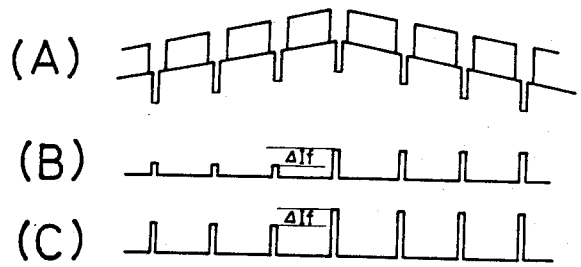
FIGS. 2(A)–2(D) are waveform charts at various points of the circuit of FIG. 1 for illustrating the problems of the conventional circuit.
Figure 2:
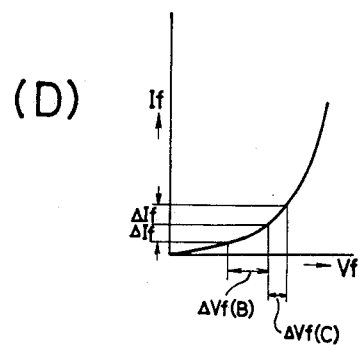
Figure 3:
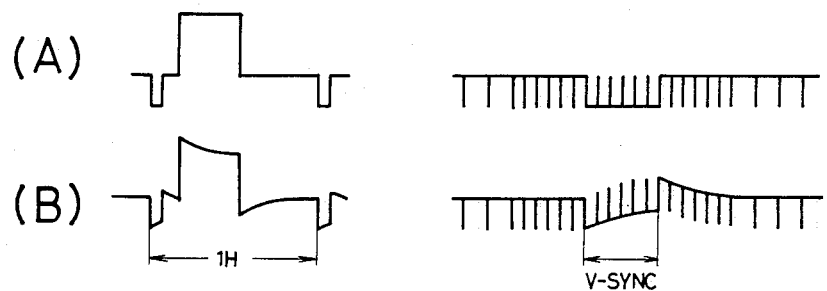
FIGS. 3(A) and 3(B) are waveform charts of a video signal derived from the clamping chapacitor of FIG. 1 ideally and actually, respectively.

The circuit of FIG. 4 operates in essentially the same manner as the circuit of FIG. 1 except for the following respects. The resistor 10 having a minute resistance value is introduced in series with the diode 2 to allow the detection of the current If flowing through the diode. The current If is then amplified by the operational amplifier 13, and thereafter the amplified current is converted into a DC voltage by means of the diode 14, capacitor 15 and resistor 16. Then, the DC voltage is added to the output from the buffer amplifier 3 via the operational amplifier 17, resistor 18 and capacitor 19 in an anti-phase relation, whereby it cancels the effects due to potential variation at the point A as already described in connection with FIGS. 1–3 at the input terminal of transistor 21.

Figure 5:
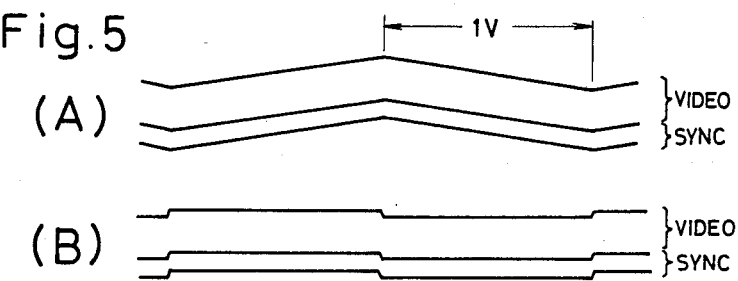
FIGS. 5(A)–5(B), 6(A)–6(E) and 7(A)–7(C) are waveform charts for illustrating the operation of the circuit configuration of FIG. 4.
Figure 6:
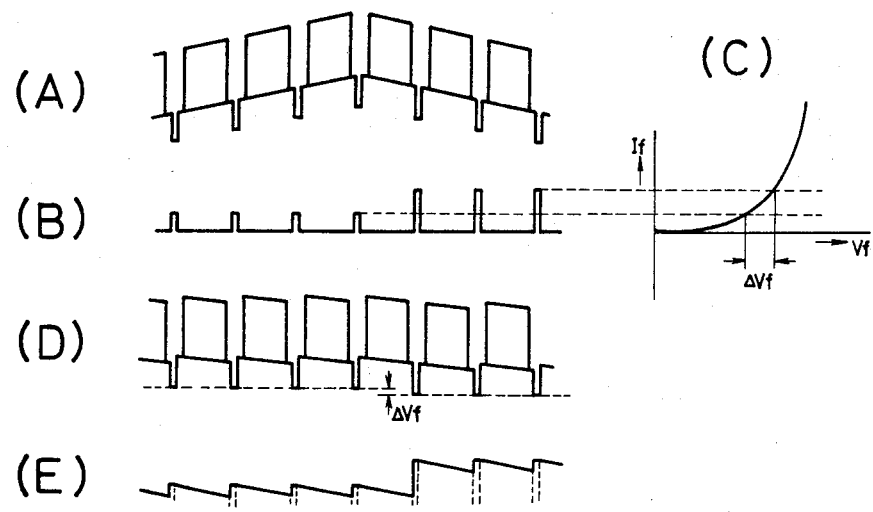
Figure 7:
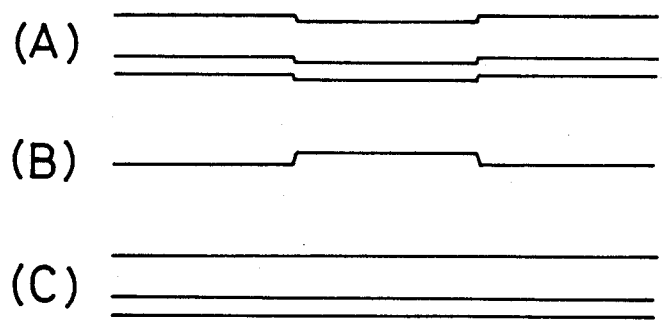

Referring next to FIGS. 5(A)–7(C), a video signal on which an energy dispersal signal is superimposed varies in black level, as conceptionally shown in FIG. 5(A). As described above in connection with FIGS. 1–3, if the capacitance of the clamping capacitor 1 is relatively large, the potential at the point A shown in FIGS. 1 and 4 varies. Thus, the output from the transistor 3 constituting a buffer amplifier cannot be sufficiently clamped, as shown in FIG. 5(B). However, the output appearing at output terminal OUT of FIG. 4 is sufficiently clamped.

The circuit of FIG. 4 is also supplied with an input signal similar to the signal shown in FIG. 6(A) and it is impossible to make the capacitance of the capacitor 1 sufficiently small. Therefore, the potential at the point A changes by a value of $\Delta V_f$, as shown in FIGS. 6(B) and 6(C), with the result that the level at each leading edge of the horizontal sync signal produced at the output of the transistor 3 is shifted by $\Delta V_f$ as shown in FIG. 6(D). It may be seen that the diagrams shown in FIGS. 5(A) and 5(B) are conceptual representations of the waveforms shown in FIGS. 6(A) and 6(D), respectively.

In the circuit of FIG. 4, the current If flowing into the diode 2 in the forward direction is detected using the detector 10 and amplified by the operational amplifier 13. As a result, a voltage as shown in FIG. 6(E) appears across the terminals of the smoothing capacitor 15. That is, the variation in the potential at the point A of FIG. 4 causes the black level of the output from the transistor 3 to vary as shown in FIG. 7(A), as described previously. Under this condition the signal as shown in FIG. 7(B) is fed from the amplifier 17 (FIG. 4) to the transistor 21 in a differential manner. The result is that the variation in black level of the output from the transistor 21 is sufficiently suppressed, as shown in FIG. 7(C).

As described above, in accordance with the present invention, waveform distortions and the like of video signal are sufficiently suppressed by selecting a relatively large value for the capacitance of the clamping capacitor 1. In addition, energy dispersal signal components can be sufficiently removed by the clamping circuit.

What is claimed is:

1. In a video clamping circuit for receiving a video signal on which an energy dispersal signal is superimposed, which includes a clamping buffer circuit having a buffer amplifier having an input section and an output section, and a clamping diode connected to the input section of the buffer amplifier, the improvement comprising:

means for detecting the current flowing through the diode and producing a detection signal indicative of a variation in an input signal level at the input section of the buffer amplifier;

means for producing a cancellation signal from said detection signal; and means for superimposing the cancellation signal on an output signal at the output section of the buffer amplifier in an anti-phase relation.

2. The improved video clamping circuit of claim 1, wherein said means for producing a cancellation signal includes an operational amplifier for amplifying the detection signal, and means for rectifying and smoothing the amplified signal from the operational amplifier.

* * * * *